(12) United States Patent
Omi

(10) Patent No.: US 8,090,181 B2
(45) Date of Patent: Jan. 3, 2012

(54) RADIOGRAPHIC IMAGE PROCESSING APPARATUS AND RADIOGRAPHIC IMAGE PROCESSING METHOD

(75) Inventor: Hiroyuki Omi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 411 days.

(21) Appl. No.: 12/467,525

(22) Filed: May 18, 2009

(65) Prior Publication Data

US 2009/0285468 A1 Nov. 19, 2009

(30) Foreign Application Priority Data

May 19, 2008 (JP) ................................. 2008-131356

(51) Int. Cl.
*G06K 9/00* (2006.01)
*H04N 5/217* (2011.01)
(52) U.S. Cl. .................... 382/132; 348/241; 348/243
(58) Field of Classification Search .................. 382/132; 348/241, 243
See application file for complete search history.

(56) References Cited

U.S. PATENT DOCUMENTS

| 7,804,533 B2 * | 9/2010 | Oshima .................. 348/246 |
| 2005/0099515 A1 | 5/2005 | Tsuruoka |
| 2008/0158395 A1 | 7/2008 | Tsuruoka |

FOREIGN PATENT DOCUMENTS

JP          3762725 B2      1/2006

* cited by examiner

*Primary Examiner* — Roy M Punnoose
(74) *Attorney, Agent, or Firm* — Canon USA Inc IP Division

(57) ABSTRACT

An image acquisition unit acquires an X-ray image obtained by irradiating a subject with an X-ray and a dark image obtained without irradiating the X-ray. A dark correction mode input unit inputs a dark correction mode for correcting the X-ray image using the dark image. A control unit sets a noise suppression parameter according to the dark correction mode received from the dark correction mode input unit. A dark correction unit corrects the X-ray image based on dark image according to the dark correction mode received from the dark correction mode input unit. A noise suppression unit performs noise suppression processing on the X-ray image corrected by the dark correction unit, using the noise suppression parameter received from the control unit.

13 Claims, 13 Drawing Sheets

FIG.4

| DARK CORRECTION MODE / CORRECTION COEFFICIENT | FORWARD | BACKWARD | AVERAGE | DICED | EVEN-ODD | N-SHEET |
|---|---|---|---|---|---|---|
| CORRECTION COEFFICIENT $k\sigma$ | 1 | 1 | $\sqrt{\dfrac{3}{4}}$ | 1 | 1 | $\sqrt{\dfrac{N+1}{2N}}$ |

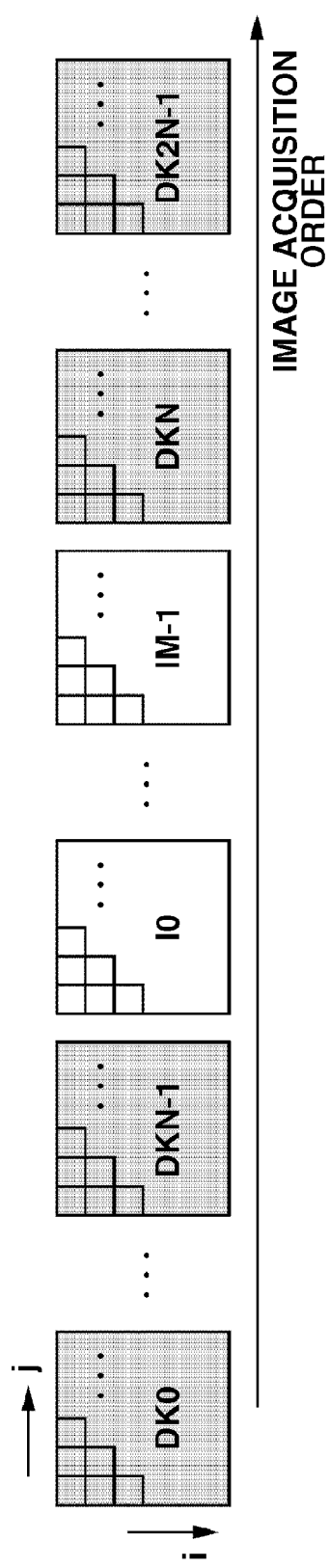

RADIOGRAPHIC IMAGE PROCESSING APPARATUS AND RADIOGRAPHIC IMAGE PROCESSING METHOD

BACKGROUND OF THE INVENTION

1. Field of the Invention

The present invention relates to an apparatus and a method for processing a radiographic image that is obtained by irradiating a subject with a radioactive ray (e.g., an X-ray).

2. Description of the Related Art

The diagnosing method, which includes irradiating a subject with an X-ray (i.e., one of various types of radioactive rays) and capturing an X-ray fluoroscopic image (i.e., an X-ray image) based on the X-ray having penetrated through the subject, is widely available in the medical field, so that acquired X-ray images can be used for various medical cares. To prevent a subject from being exposed to an excessive amount of X-ray, the dose of the X-ray that may be used for capturing an X-ray image is generally set to a very weak level. Therefore, the captured X-ray image tends to be an image including a large amount of random noise that depends on energy particles of the X-ray. Accordingly, to improve the visibility of an X-ray image, it is very important to perform noise suppression processing in an X-ray fluoroscopic imaging operation.

To enhance the effect of noise suppression, an accurate estimation of a noise amount included in an X-ray image is necessary. For example, an edge may be blurred if the degree of the applied noise suppression processing is excessive, or the noise may not be removed if the noise suppression processing is insufficient.

According to a conventional method for estimating the amount of noise included in an X-ray image, for example, as discussed in Japanese Patent No. 3762725, it may be useful to analyze a subject in each frame of a moving image and estimate a noise amount of each subject. In this case, the technique discussed in Japanese Patent No. 3762725 is described based on a video camera. However, similar effects may be obtained for X-ray images.

If a subject is thick, the X-ray cannot easily penetrate through the subject. In other words, a thick subject decreases the amount of an X-ray dose that may be detected by an X-ray sensor. Therefore, the X-ray image may include a relatively large amount of noise compared to an output value of an X-ray sensor signal (i.e., an X-ray image signal). Accordingly, it is effective to estimate the noise amount for each subject.

The random noise included in an X-ray image can be expressed as a variation amount of a pixel value in a specific region in a case where the irradiation X-ray dose has a constant intensity "X." The random noises can be classified into two types of noises, i.e., a random quantum noise and an electric random system noise. The random quantum noise may change the pixel value with a standard deviation σq(X) resulting from the X-ray dose "X." The electric random system noise may change the pixel value with a standard deviation σs that may be received from an X-ray sensor or a peripheral electric circuit.

It can be analyzed that the above-described two types of random noises are added as a random noise to an X-ray image. The following formula (1) defines an X-ray random noise amount σ(X), which is a standard deviation of the random noise.

When "X" represents an X-ray intensity, the variable X is considered as equivalent to an average pixel value of an X-ray image. In formula (1), σq(X) is dependent on the X-ray intensity "X" and variable according to the following formula (2). In formula (2), Kq is a conversion coefficient that can be used to calculate a noise amount from the X-ray intensity. In formula (1), σs is a constant value representing electric thermal noise, which is independent from the X-ray intensity.

$$\sigma(X) = \sqrt{\sigma_q(X)^2 + \sigma_s^2} \quad (1)$$

$$\sigma_q = K_q \cdot (X)^{\frac{1}{2}} \quad (2)$$

FIG. 12 is a characteristic graph illustrating an example of a relationship between the X-ray intensity "X" and the X-ray random noise amount σ(X), which can be obtained according to formula (1). In FIG. 12, the abscissa axis represents the X-ray intensity "X" and the ordinate axis represents the X-ray random noise amount σ(X) that is a standard deviation of the random noise.

In FIG. 12, a straight line 1201 represents a relationship between the X-ray intensity "X" and the random quantum noise amount σq(X), and a straight line 1202 represents a relationship between the X-ray intensity "X" and the random system noise amount σs. In FIG. 12, a curve 1203 represents a random noise amount σ(X) that is a sum of the random quantum noise amount σq(X) and the random system noise amount σs.

As understood from the relationship illustrated in FIG. 12, the random system noise has larger effects in the X-ray intensity region (i.e., a low dose region) indicated by "A", compared to the random quantum noise.

The X-ray image acquired from an X-ray sensor generally includes dark components. In this description, the term "dark" indicates a constant offset amount. A method for correcting the offset can be referred to as a dark correction method.

A basic dark correction method includes removing a "dark image" (i.e., an image captured without using an X-ray) from an X-ray image (i.e., an image captured when a subject is irradiated with an X-ray). There are various types of dark correction methods that are different in the method for selecting dark image(s). For example, the dark correction methods may include a "forward" dark correction, a "backward" dark correction, an "average" dark correction, a "diced" dark correction, an "even-odd" dark correction, and an "N-sheet" dark correction.

The "forward" dark correction uses a "forward" dark image to correct an X-ray image. The "backward" dark correction uses a "backward" dark image. The "average" dark correction uses an "average" dark image. The "diced" dark correction uses a "diced" dark image. The "even-odd" dark correction uses an "even-odd" dark image. The "N-sheet" dark correction uses an "N-sheet" dark image.

FIGS. 13A and 13B illustrate general dark correction methods. FIG. 13A illustrates examples of X-ray images (i.e., I0 to I2, . . . ) and dark images (i.e., D0 to D2, . . . ). FIG. 13B illustrates examples of dark images (i.e., DK0 to DK4, . . . ).

FIG. 13A illustrates a pattern of the dark images and X-ray images alternately acquired in an X-ray fluoroscopic imaging operation. FIG. 13B illustrates a pattern of the dark images continuously captured. Each dark correction method is described below in a case where the dark correction processing is performed on an X-ray image I0 illustrated in FIG. 13A.

The "forward" dark correction is a dark correction that may be performed based on a forward dark image D0 acquired immediately before the X-ray image I0 (i.e., a processing object). The "backward" dark correction is a dark correction that may be performed based on a backward dark image D1 acquired immediately after the X-ray image I0 (i.e., the processing object). The "average" dark correction is a dark correction that may be performed based on an average dark image that can be obtained by averaging the forward dark image D0 and the backward dark image D1 in each pixel.

The "diced" dark correction is a dark correction that may be performed based on a diced dark image that can be generated by alternately selecting the forward dark image D0 and the backward dark image D1. In this case, the selection method for the diced dark image is determined so as to form a diced pattern. The "even-odd" dark correction is a dark correction that may be performed based on an even-odd dark image that can be generated by alternately selecting the forward dark image D0 and the backward dark image D1.

More specifically, the even-odd dark image can be obtained by sequentially selecting the forward dark image D0 or the backward dark image D1 for each line. The "N-sheet" dark correction is a dark correction that may be performed based on an N-sheet dark image that can be generated by averaging N sheets of dark images DK0 to DKN illustrated in FIG. 13B.

FIG. 13C illustrates example dark corrections that can be performed on the X-ray image I0 and the X-ray image I1 illustrated in FIG. 13A according to the above-described various dark correction methods. The following is an example that actually identifies a random noise included in an X-ray image.

The correction includes a first step of removing a dark image from an X-ray image to generate a dark correction-completed X-ray image. The correction includes a second step of calculating a random quantum noise amount $\sigma q(X)$ based on the dark correction-completed X-ray image. The random quantum noise amount $\sigma q(X)$ is dependent on the X-ray intensity "X." Therefore, the correction includes a step of calculating an average pixel value X of the dark correction-completed X-ray image and calculating the random quantum noise amount $\sigma q(X)$ by inputting the calculated average pixel value X into formula (2).

As understood from the straight line 1202 illustrated in FIG. 12, the random system noise amount $\sigma s$ is a constant value that is independent on the X-ray intensity "X." Therefore, it is difficult to obtain the random system noise amount $\sigma s$ from the dark correction-completed X-ray image. It is useful to calculate the random system noise amount $\sigma s$ from the dark image.

The correction includes performing dark correction processing on dark images (obtaining a difference between two sheets of dark images) and calculating a standard deviation of the image. When the dark images are used, an X-ray random noise amount corresponding to the X-ray intensity of 0 can be calculated. Namely, the random system noise amount $\sigma s$ can be obtained from the standard deviation. In this case, if the dark image includes a random system noise amount $\sigma D$, the random system noise amount $\sigma s$ is equal to $(\sqrt{2})\sigma D$ as illustrated in the following formula (3).

$$\sigma_S = \sqrt{1^2 + (-1)^2} \sigma_D = \sqrt{2} \sigma_D \tag{3}$$

An X-ray image capturing apparatus can operate to capture X-ray images in various shooting modes. For example, the shooting modes include a high quality mode for outputting a noiseless image and a high frame rate mode for outputting a high frame rate image. For example, it may be desired to select the high quality mode if a user intends to diagnose details of a subject. The high frame rate mode may be desired to diagnose a subject that can move quickly.

If the high quality mode is selected, the following processing methods are available for the X-ray image capturing apparatus to output noiseless images.

For example, as a method for increasing the ratio of X-ray image signal to the noise, it may be possible to increase the X-ray amount in an imaging operation. As another method, it may be effective to enhance the degree of random noise suppression processing. Further, as another method, it may be useful to perform the "average dark correction."

In this case, a dark image can be acquired and used for each X-ray image. A variation in the dark image can be reflected. Accordingly, the accuracy of the dark correction can be increased. If the dark correction is inappropriate, the image quality of an X-ray image may deteriorate due to insufficient removal of dark components. Therefore, it is important to select an optimum dark correction method.

On the other hand, if the high frame rate mode is selected, the following processing methods are available for the X-ray image capturing apparatus to output higher frame rate images.

For example, there is a method for decreasing the X-ray image signal (i.e., X-ray image data) that may be generated by an X-ray sensor. The time required for the image processing can be reduced by decreasing the size of data that may be used for the image processing. As another method, it may be useful to select the image processing that is short in processing time.

Additionally, as another method, it may be useful to select the "N-sheet" dark correction to perform dark correction processing. The time required for acquiring dark images can be reduced by preparing dark images beforehand. However, even if the image processing is speedily performed, the processing itself cannot start unless the next frame is input. In this respect, selecting an optimum dark correction is important.

As described above, if the dark correction method is changed by selecting an appropriate mode, it may be possible to attain a higher frame rate. However, an output image resulting from random noise suppression processing in a post stage may cause an artifact that deteriorates the image quality.

Moreover, in the high quality mode, the image quality can be maintained at a higher level before executing the random noise suppression processing. However, the artifact may occur in an output image after the random noise suppression processing is started and high quality images may not be obtained. In particular, if the processing object is a moving image, an output image may include a blur caused by the movement.

In short, the above-described conventional technique cannot perform optimum noise suppression processing on X-ray images (i.e., radiographic images) and cannot obtain high quality X-ray images (i.e., high quality radiographic images).

To solve the above-described problems, exemplary embodiments of the present invention are directed to a technique capable of performing optimum noise suppression processing on a radiographic image so that a high quality radiographic image can be acquired.

SUMMARY OF THE INVENTION

The present invention has been made in consideration of the above situation, and has an object to provide a technique capable of performing optimum noise suppression processing on a radiographic image so that a high quality radiographic image can be acquired.

According to the present invention, a radiographic image processing apparatus includes an image acquisition unit configured to acquire a radiographic image obtained by irradiating a subject with a radioactive ray and a dark image obtained without irradiating the radioactive ray, a correction mode input unit configured to input a correction mode for correcting the radiographic image using the dark image, a parameter setting unit configured to set a first parameter according to the correction mode, a dark correction unit configured to correct the radiographic image based on the dark image according to the correction mode, and a noise suppression unit configured to perform noise suppression processing on the radiographic image corrected by the dark correction unit, using the first parameter.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 illustrates examples of random system noise correction coefficients in various dark correction modes (i.e., various dark correction methods).

FIGS. 8A and 8B illustrate examples of the dark correction mode (i.e., the dark correction method).

DETAILED DESCRIPTION OF THE EMBODIMENTS

Exemplary embodiments of the invention will be described in detail below with reference to the drawings.

The best mode for carrying out the present invention is described below with reference to the attached drawings. The following exemplary embodiments of the present invention are directed to an X-ray image processing apparatus that uses an X-ray as a radioactive ray. The present invention is also applicable to a radiographic image processing apparatus that processes a radiographic image based on another radioactive ray, such as $\alpha$-ray, $\beta$-ray, and $\gamma$-ray.

As a cause of an inadequate operation in the random noise suppression processing that may occur when the dark correction method is changed, it is considered that a random system noise amount of an X-ray image having been subjected to the dark correction has a significant influence. According to a conventional technique, the dark correction is performed to remove dark components from an X-ray image. However, for example, if a dark image is generated, a random system noise amount of the dark image itself may change.

Accordingly, for example, obtaining a value $\sigma s$ as a standard deviation based on a differential image of two sheets of dark images and simply using the obtained value $\sigma s$ as a parameter for the random noise suppression processing (i.e., as the random system noise amount) is not desired.

The present invention sets the random system noise amount (i.e., a noise suppression parameter that may be used for the random noise suppression processing) according to a dark correction mode (i.e., for each dark correction mode), to eliminate the occurrence of an artifact (e.g., a blur caused by the movement).

Figure 1:
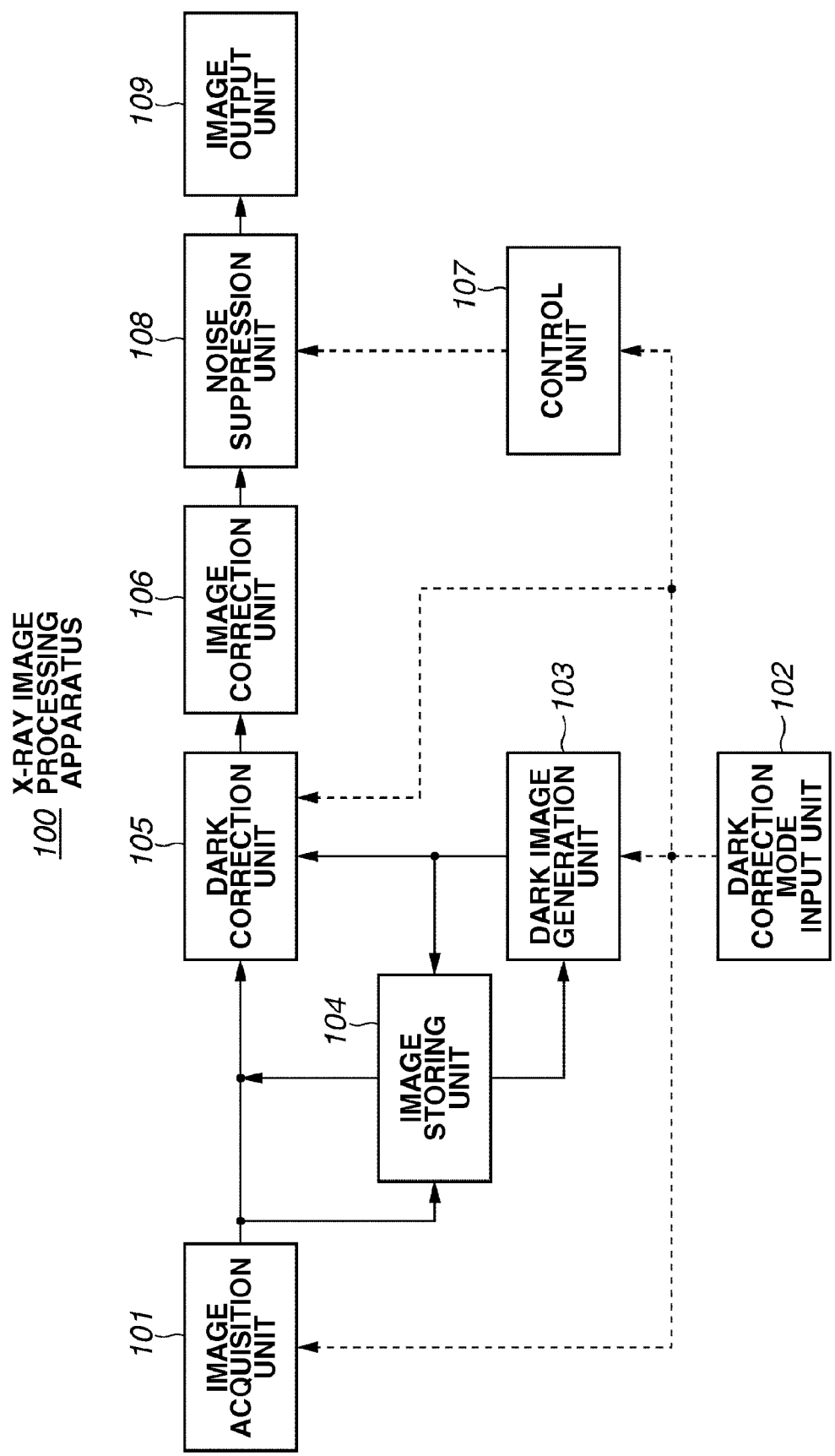
FIG. 1 is a block diagram illustrating an example of a functional configuration of an X-ray image processing apparatus (i.e., a radiographic image processing apparatus) according to an exemplary embodiment.

FIG. 1 is a block diagram illustrating an example of a functional configuration of an X-ray image processing apparatus (i.e., a radiographic image processing apparatus) according to an exemplary embodiment of the present invention.

The X-ray image processing apparatus 100 illustrated in FIG. 1 includes an image acquisition unit 101, a dark correction mode input unit 102, a dark image generation unit 103, an image storing unit 104, a dark correction unit 105, an image correction unit 106, a control unit 107, a noise suppression unit 108, and an image output unit 109.

The image acquisition unit 101 performs processing for acquiring two types of images, and outputs the acquired images. For example, the image acquisition unit 101 includes an X-ray sensor and is configured to acquire various images detected by the X-ray sensor. The image acquisition unit 101 may be configured to acquire various images via a communication unit from an external X-ray sensor.

The image acquisition unit 101 can acquire a first image in an X-ray imaging operation according to which a subject is irradiated with an X-ray and the image acquisition unit 101 may capture an X-ray image (i.e., a radiographic image) based on the X-ray having penetrated through the subject. The image acquisition unit 101 can further acquire a second image in a dark imaging operation according to which a subject is not irradiated with the X-ray and the image acquisition unit 101 may capture a dark image.

The dark correction mode input unit 102, when a user selects a dark correction method or an image capturing method, can perform processing for inputting the dark correction mode for the X-ray image acquired by the image acquisition unit 101 in each functional component of the X-ray image processing apparatus 100.

The dark image generation unit 103 can receive a plurality of dark images from the image storing unit 104 and the dark correction mode from the dark correction mode input unit 102, and can generate a composite dark image resulting from the entered plurality of dark images according to the input dark correction mode.

The image storing unit 104 can receive X-ray images and dark images from the image acquisition unit 101 and composite dark images from the dark image generation unit 103. The image storing unit 104 can output a stored image, if necessary.

The dark correction unit 105 can receive an X-ray image from the image acquisition unit 101 (or the image storing unit 104) and a composite dark image from the dark image generation unit 103 (or a dark image from the image storing unit 104), and can output a dark correction-completed X-ray image. More specifically, the dark correction unit 105 can perform dark correction processing on the input X-ray image referring to the composite dark image (or the dark image generated by the image storing unit 104), and can output an X-ray image having been subjected to the dark correction processing as the dark correction-completed X-ray image.

The image correction unit 106 can receive the dark correction-completed X-ray image from the dark correction unit 105. The image correction unit 106 can output a sensor characteristics correction-completed X-ray image. More specifically, the image correction unit 106 can perform correction processing on the dark correction-completed X-ray image referring to the sensor characteristics of the X-ray sensor, which was set for the X-ray image acquired by the image acquisition unit 101, and can output an X-ray image having been subjected to the correction as the sensor characteristics correction-completed X-ray image.

The control unit 107 can receive the dark correction mode from the dark correction mode input unit 102, and can output a noise suppression control value, which is a noise suppression parameter (i.e., a first parameter), according to the dark correction mode.

The noise suppression unit 108 can receive the sensor characteristics correction-completed X-ray image from the image correction unit 106 and the noise suppression control value from the control unit 107, and can output a noise suppressed X-ray image. More specifically, the noise suppression unit 108 can perform noise suppression processing on the sensor characteristics correction-completed X-ray image referring to the noise suppression control value (i.e., the noise suppression parameter) generated by the control unit 107. The noise suppression unit 108 can output an X-ray image having been subjected to the noise suppression processing as the noise suppressed X-ray image.

The image output unit 109 can receive the noise suppressed X-ray image from the noise suppression unit 108 and can output the received image to a display device.

Figure 2:
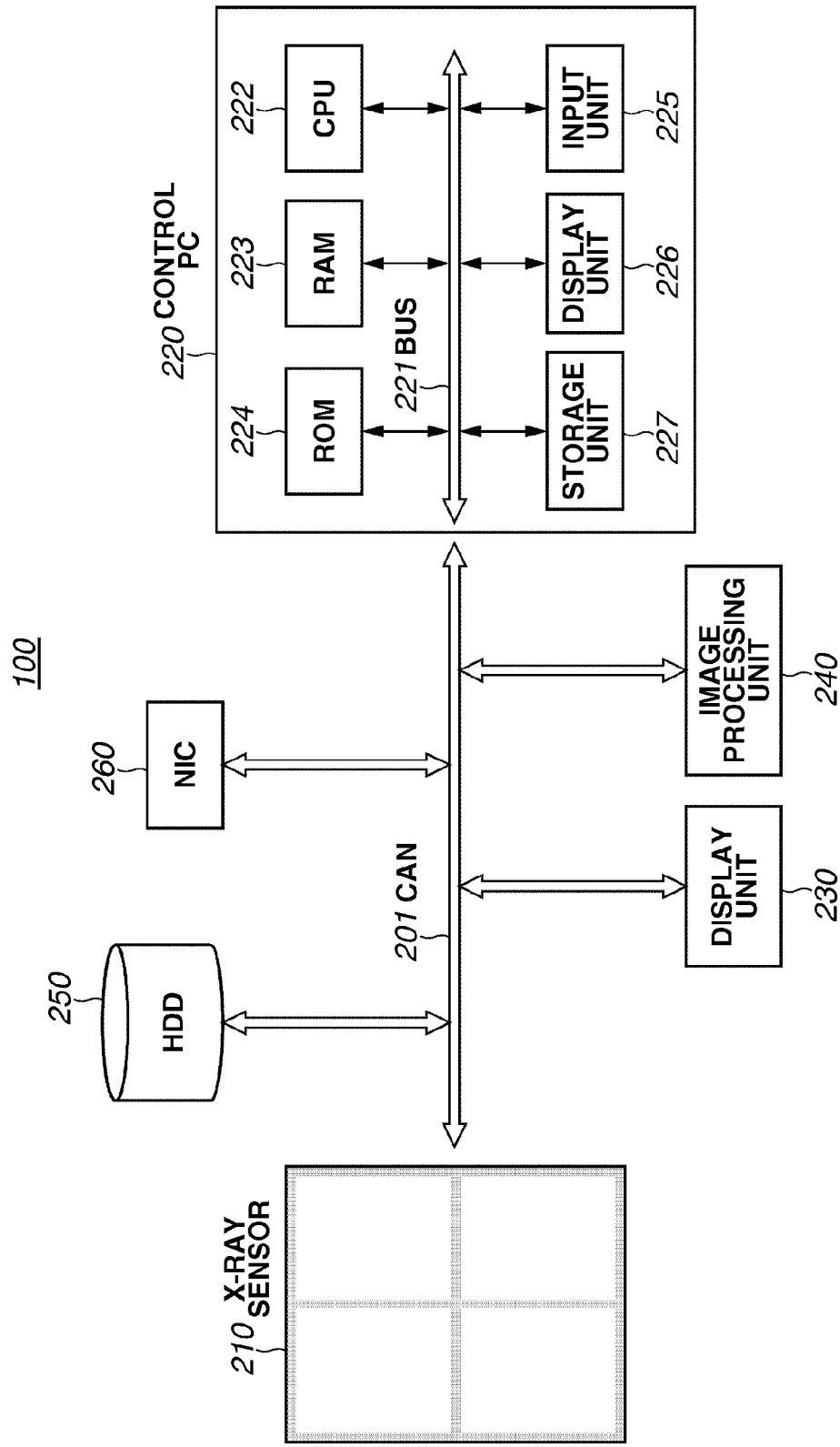
FIG. 2 is a block diagram illustrating an example of a hardware configuration of the X-ray image processing apparatus (i.e., the radiographic image processing apparatus) according to the present exemplary embodiment.

FIG. 2 is a block diagram illustrating an example of a hardware configuration of the X-ray image processing apparatus (i.e., the radiographic image processing apparatus) according to an exemplary embodiment of the present invention. As illustrated in FIG. 2, the X-ray image processing apparatus 100 includes a controller area network (i.e., CAN) 201, an X-ray sensor 210, a control PC 220, a display unit 230, an image processing unit 240, a hard disk drive (HDD) 250, and a network interface (NIC) 260.

The CAN 201 is a connection unit that is configured to enable the X-ray sensor 210, the control PC 220, the display unit 230, the image processing unit 240, the HDD 250, and the NIC 260 to communicate with each other. The CAN 201 is a mere example of the connection unit that connects constituent components of the X-ray image processing apparatus 100. For example, the CAN 201 can be replaced by an optical fiber or another comparable connection device.

The X-ray sensor 210 is an imaging unit configured to obtain an X-ray image in an X-ray imaging operation according to which an X-ray generation unit (not illustrated) emits an X-ray toward a subject (not illustrated) and the X-ray sensor 210 performs image capturing processing based on the X-ray having penetrated through the subject. The X-ray sensor 210 can further obtain a dark image in a dark imaging operation according to which the X-ray generation unit (not illustrated) does not emit an X-ray toward a subject (not illustrated) and the X-ray sensor 210 performs image capturing processing without using the X-ray having penetrated through the subject.

The control PC 220 can control various operations that may be performed by the X-ray image processing apparatus 100. For example, the control PC 220 includes a bus 221, a central processing unit (CPU) 222, a random access memory (RAM) 223, a read only memory (ROM) 224, an input unit 225, a display unit 226, and a storage unit 227, as illustrated in FIG. 2. The control PC 220 can send commands to the X-ray sensor 210 and the image processing unit 240, if necessary.

The bus 221 connects the CPU 222, the RAM 223, the ROM 224, the input unit 225, the display unit 226, and the storage unit 227, and enables them to communicate with each other. The CPU 222 controls various operations that may be performed by the control PC 220. The CPU 222 can control the constituent components 223 to 227 of the control PC 220 via the bus 221.

The RAM 223 can function as a main memory and a work area for the CPU 222. The CPU 222 can execute a program and process information that may be loaded into the RAM 223 from the ROM 224 or the storage unit 227 to realize various operations. The ROM 224 can store, for example, a Basic Input/Output System (BIOS) and an operating system program (OS) that are required for operations of the CPU 222.

The input unit 225 is an operation input unit that is configured to enable users to operate the control PC 220. The display unit 226 can display various information and various images under the control of the CPU 222. The storage unit 227 can store, for example, programs and various data that may be used by the CPU 222 to execute the processing according to the present exemplary embodiment. The storage unit 227 can also store various information (including various images and data) that may be obtained through the processing performed by the CPU 222.

The display unit 230 is an external display device, which is connected to the control PC 220 via the CAN 201. For example, the display unit 230 can display various information and images under the control of the CPU 222. For example, the image processing unit 240 can perform image processing under the control of the CPU 222.

The HDD 250 is an external storage device, which is connected to the control PC 220 via the CAN 201. For example, the HDD 250 can store various information (including various images and data) that may be obtained through the processing of the CPU 222. The NIC 260 is a communication unit configured to control communications performed between the X-ray image processing apparatus 100 and an external device of the X-ray image processing apparatus 100.

The configuration illustrated in FIG. 1 and the configuration illustrated in FIG. 2 are in the following relationship. For example, the image acquisition unit 101 illustrated in FIG. 1 corresponds to the X-ray sensor 210. The dark correction mode input unit 102 and the control unit 107 illustrated in FIG. 1 can be realized by the control PC 220.

More specifically, the dark correction mode input unit 102 corresponds to, for example, the input unit 225. For example, the control unit 107 can be realized by the CPU 222 and programs that may be stored in the storage unit 227. In this case, the storage unit 227 can store, for example, processing programs for each dark correction method (i.e., each dark correction mode) and for each image capturing method (i.e., shooting mode). The program can be loaded into the RAM 223, if necessary, and can be executed by the CPU 222.

For example, the image storing unit 104 illustrated in FIG. 1 corresponds to the HDD 250, the storage unit 227, or the RAM 223. The dark image generation unit 103, the dark correction unit 105, the image correction unit 106, and the noise suppression unit 108 illustrated in FIG. 1 can be realized, for example, by the image processing unit 240, the CPU 222, and the programs stored in the storage unit 227.

The dark image generation unit 103, the dark correction unit 105, the image correction unit 106, and the noise suppression unit 108 include a portion mounted on the image processing unit 240 and a portion mounted on the control PC 220. The image output unit 109 illustrated in FIG. 1 corresponds, for example, to the display unit 226, the display unit 230, the HDD 250, and the NIC 260.

According to the X-ray image processing apparatus 100 illustrated in FIG. 2, the control PC 220 performs at least part of the processing. However, according to another exemplary embodiment, the X-ray image processing apparatus 100 may include a hardware configuration that can realize processing comparable to the processing performed by the control PC.

In this case, all of the functional components illustrated in FIG. 1 may be configured by dedicated hardware components. In short, the X-ray image processing apparatus 100 according to the present exemplary embodiment can appropriately employ an optimum configuration according to a purpose of the apparatus.

Exemplary embodiments of the present invention, each incorporating the above-described X-ray image processing apparatus 100, are described below. A first exemplary embodiment of the present invention is described below.

Figure 3:
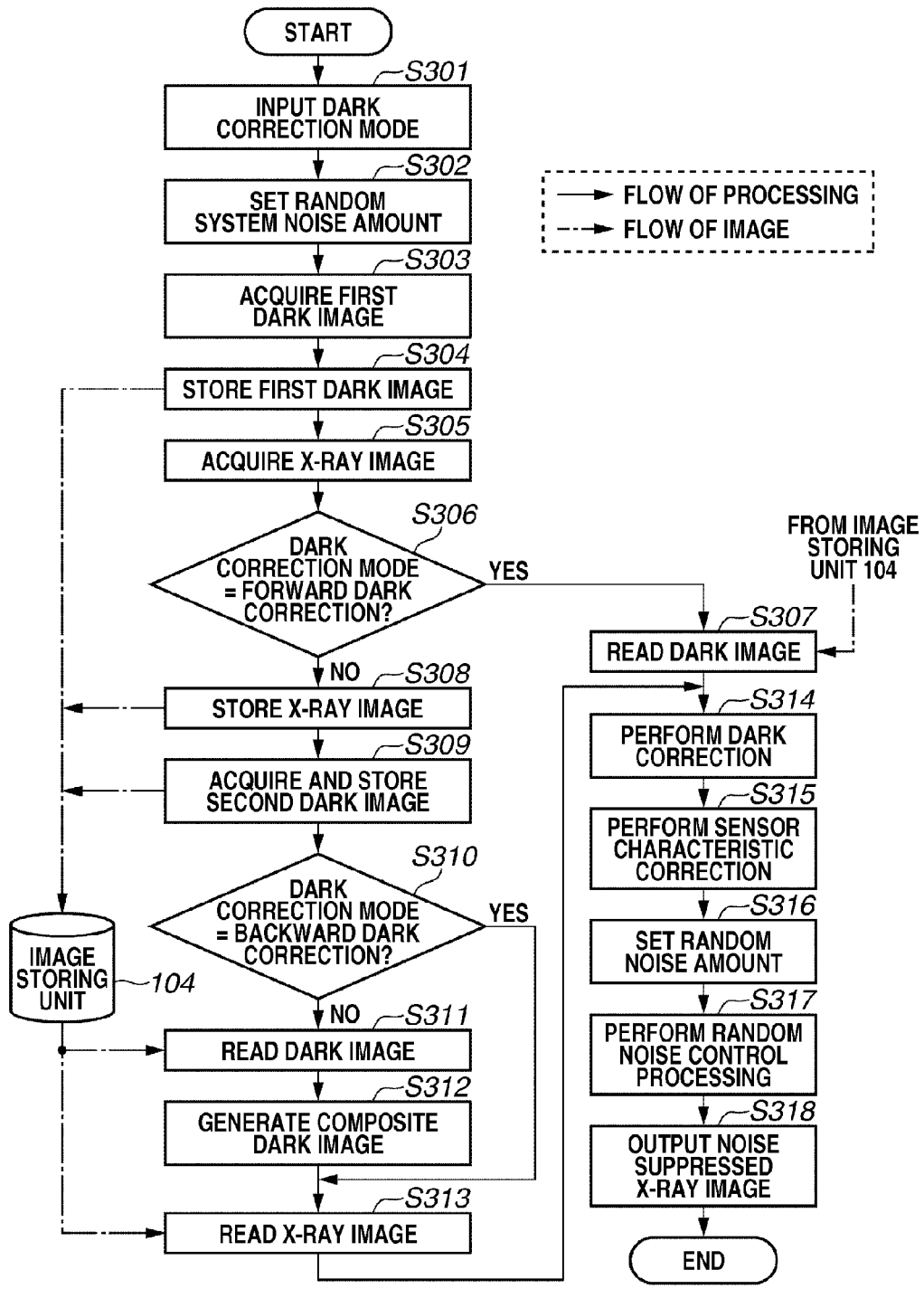
FIG. 3 is a flowchart illustrating an example of a processing procedure of an X-ray image processing method (i.e., a radiographic image processing method), which can be performed by the X-ray image processing apparatus (i.e., the radiographic image processing apparatus), according to the present exemplary embodiment.
Figure 5A:
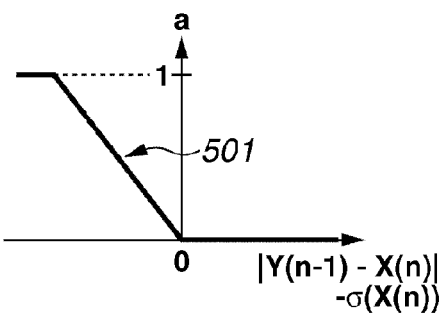
FIGS. 5A to 5D illustrate example functions that may be used in feedback coefficient correction processing.
Figure 5C:
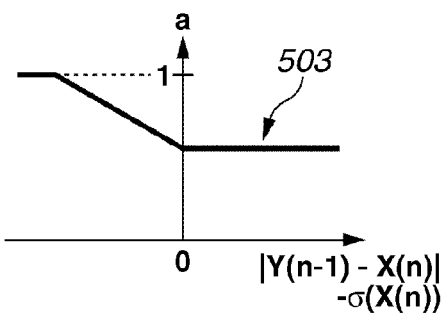
Figure 5B:
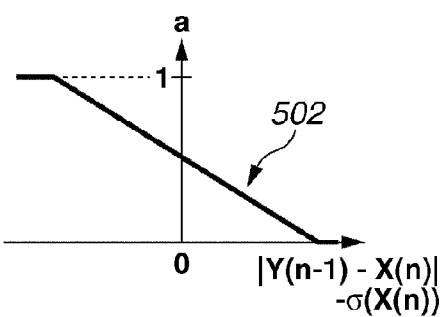
Figure 5D:
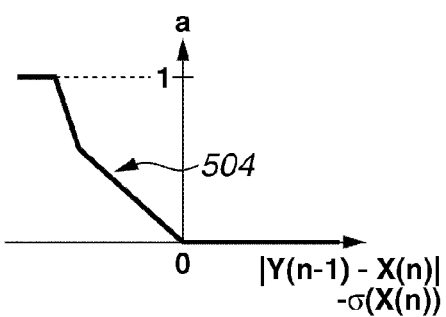
Figure 6A:
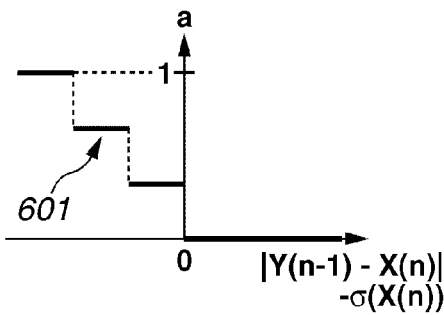
FIGS. 6A to 6D illustrate example functions that may be used in the feedback coefficient correction processing.
Figure 6C:
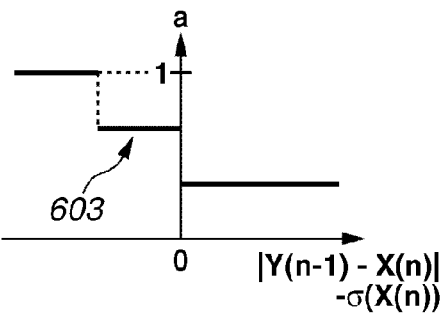
Figure 6B:
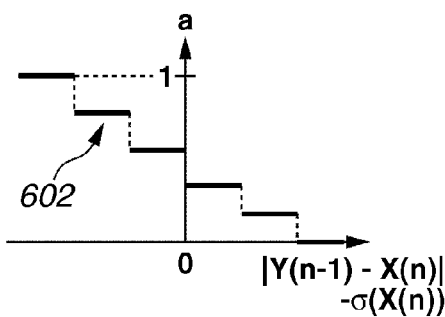
Figure 6D:
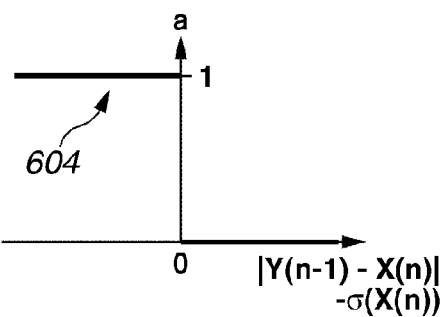

FIG. 3 is a flowchart illustrating an example of a processing procedure of an X-ray image processing method (i.e., a radiographic image processing method), which can be performed by the X-ray image processing apparatus (i.e., the radiographic image processing apparatus), according to the first exemplary embodiment of the present invention. The flowchart illustrated in FIG. 3 is described below with reference to the functional configuration of the X-ray image processing apparatus 100 illustrated in FIG. 1.

For example, if a user selects a dark correction method, then in step S301, the dark correction mode input unit 102 performs processing for inputting a dark correction mode based on the dark correction method to each functional component of the X-ray image processing apparatus 100. More specifically, the dark correction mode input unit 102 performs processing for inputting the dark correction mode to the image acquisition unit 101, the dark image generation unit 103, the dark correction unit 105, and the control unit 107.

In step S302, the control unit 107 calculates and sets a random system noise amount σD_COR according to the dark correction mode entered from the dark correction mode input unit 102. The control unit 107 stores the random system noise amount σD_COR, for example, in its internal memory. The random system noise amount σD_COR is a value that can be obtained by correcting the above-described random system noise amount σs.

In this case, the random system noise amount σs is, for example, a value that may be given by a user before starting an imaging operation, or a value that can be calculated by the control unit 107 according to the above-described formula (3), for example, before starting an imaging operation is performed or when a dark image is acquired. The random system noise amount σs can be, for example, stored in the internal memory of the control unit 107.

The random system noise amount σD_COR, which is set in step S302, is the noise suppression parameter (i.e., the first parameter) that may be used by the noise suppression unit 108 that performs the noise suppression processing. In this respect, the control unit 107 serves as a parameter setting unit configured to perform the processing of step S302. The following formula (4) defines a relationship between the random system noise amount σD_COR and the random system noise amount σs.

$$\sigma_{D\_COR} = k_\sigma \cdot \sigma_S \qquad (4)$$

In formula (4), kσ represents a random system noise correction coefficient. FIG. 4 illustrates examples of the random system noise correction coefficient kσ in each dark correction mode (i.e., each dark correction method) according to the first exemplary embodiment of the present invention.

In this case, the control unit 107 calculates a correction coefficient kσ according to the dark correction mode entered from the dark correction mode input unit 102. The control unit 107 calculates and sets a random system noise amount σD_COR based on the correction coefficient kσ and the random system noise amount σs. The random system noise correction coefficient kσ corresponds to a second parameter that may be used to set the random system noise amount σD_COR, which is the noise suppression parameter (i.e., the first parameter).

The dark correction mode may be set to one of the "forward" dark correction, the "backward" dark correction, the "diced" dark correction, and the "even-odd" dark correction. In this case, if focusing on each pixel, it is understood that the X-ray image is subtracted by a composite dark image that is not subjected to average processing. Similar to the calculation of the random system noise amount σs, it can be considered that the X-ray image of the above-described random system noise amount σD is subtracted by the dark image of the random system noise amount σD.

Therefore, in these dark correction modes, the random system noise amount σD_COR is equal to the random system noise amount σs. Namely, as illustrated in FIG. 4, the correction coefficient kσ is 1.

The dark correction mode may also be set to the "average" dark correction or the "N-sheet" dark correction. In this case, if focusing on each pixel, it is understood that the X-ray image is subtracted by a composite dark image that is subjected to the average processing.

If the dark correction mode is the "N-sheet" dark correction, the following formula (5) expresses a random system noise amount σDN involved in the composite dark image.

$$\sigma_{DN} = \sigma_D \cdot \sqrt{\left(\frac{1}{N}\right)^2 + \left(\frac{1}{N}\right)^2 + \ldots} = \sigma_D \cdot \sqrt{\frac{N}{N^2}} = \sigma_D \cdot \sqrt{\frac{1}{N}} \qquad (5)$$

The following formula (6) expresses a random system noise amount σDN_COR having been subjected to the dark correction.

$$\sigma_{DN\_COR} = \sigma_D \cdot \sqrt{(1)^2 + \left(\sqrt{\frac{1}{N}}\right)^2} = \sigma_D \cdot \sqrt{\frac{N+1}{N}} \qquad (6)$$

Therefore, if the dark correction mode is the "N-sheet" dark correction, the following formula (7) expresses the correction coefficient kσ as illustrated in FIG. 4.

$$k_\sigma = \frac{1}{\sqrt{2}} \cdot \sqrt{\frac{N+1}{N}} = \sqrt{\frac{N+1}{2N}} \qquad (7)$$

If the dark correction mode is the "average" dark correction, the correction coefficient kσ is √(¾) as illustrated in FIG. 4. Referring back to FIG. 3, if the processing of step S302 is completed, the processing proceeds to step S303. When the processing proceeds to step S303, the image acquisition unit 101 performs processing for acquiring a first dark image.

In step S304, the image acquisition unit 101 performs processing for storing the first dark image acquired in step S303 in the image storing unit 104.

In step S305, the image acquisition unit 101 performs processing for acquiring an X-ray image. In step S306, the image acquisition unit 101 determines whether the dark correction mode, which is entered from the dark correction mode input unit 102 in step S301, is the "forward" dark correction.

In step S306, if it is determined that the dark correction mode is the "forward" dark correction (YES in step S306), the image acquisition unit 101 outputs the X-ray image acquired in step S305 to the dark correction unit 105. Then, the processing proceeds to step S307. When the processing proceeds to step S307, the dark correction unit 105 receives the X-ray image from the image acquisition unit 101 and performs processing for reading the first dark image (i.e., the image stored in step S304) from the image storing unit 104.

Then, the processing proceeds to step S314, in which the dark correction unit 105 performs dark correction processing on the X-ray image acquired in step S305 based on the first dark image acquired in step S303 according to the dark correction mode entered in step S301.

In step S306, if the image acquisition unit 101 determines that the dark correction mode is not the "forward" dark correction (NO in step S306), the processing proceeds to step S308. When the processing proceeds to step S308, the image acquisition unit 101 performs processing for storing the X-ray image acquired in step S305 in the image storing unit 104.

In step S309, the image acquisition unit 101 performs processing for acquiring a second dark image. Then, the image acquisition unit 101 performs processing for storing the acquired second dark image into the image storing unit 104.

In step S310, the image acquisition unit 101 determines whether the dark correction mode, which is entered from the dark correction mode input unit 102 in step S301, is the "backward" dark correction.

In step S310, if the image acquisition unit 101 determines that the dark correction mode is not the "backward" dark correction (NO in step S310), the processing proceeds to step S311. When the processing proceeds to step S311, the dark image generation unit 103 performs processing for reading, from the image storing unit 104, the first dark image acquired in step S303 and the second dark image acquired in step S309.

In step S312, the dark image generation unit 103 generates a composite dark image that is resultant from the first dark image and the second dark image, which are read in step S311. Then, the dark image generation unit 103 outputs the generated composite dark image to the dark correction unit 105.

In step S313, the dark correction unit 105 receives the composite dark image from the dark image generation unit 103 and performs processing for reading the X-ray image (i.e., the image stored in step S308) from the image storing unit 104.

Then, the processing proceeds to step S314 in which the dark correction unit 105 performs dark correction processing on the X-ray image acquired in step S305 based on the composite dark image generated in step S312 according to the dark correction mode entered in step S301.

On the other hand, in step S310 if it is determined that the dark correction mode is the "backward" dark correction (YES in step S310), the processing proceeds to step S313. In this case, when the processing proceeds to step S313, the dark correction unit 105 performs processing for reading, from the image storing unit 104, the second dark image stored in step S309 and the X-ray image stored in step S308.

Then, the processing proceeds to step S314, in which the dark correction unit 105 performs dark correction processing on the X-ray image acquired in step S305 based on the second dark image acquired in step S309 according to the dark correction mode entered in step S301.

If the processing of step S314 is completed, the dark correction unit 105 outputs an X-ray image having been subjected to the dark correction processing as the dark correction-completed X-ray image to the image correction unit 106.

Subsequently, i.e., when the processing proceeds to step S315, the image correction unit 106 performs correction processing on the dark correction-completed X-ray image received from the dark correction unit 105 referring to the characteristics of the X-ray sensor (i.e., sensor characteristics). For example, the image correction unit 106 performs a gain correction and a defect correction. Then, the image correction unit 106 outputs a dark correction-completed X-ray image having been subjected to the correction processing as a sensor characteristics correction-completed X-ray image to the noise suppression unit 108.

According to the X-ray image processing apparatus 100 illustrated in FIG. 1, the image correction unit 106 is positioned on the downstream side of the dark correction unit 105. Alternatively, the image correction unit 106 can be positioned on the upstream side of the dark correction unit 105. More specifically, the processing order can be arbitrarily determined between the dark correction processing by the dark correction unit 105 and the image correction processing by the image correction unit 106.

In step S316, the noise suppression unit 108 receives the sensor characteristics correction-completed X-ray image from the image correction unit 106 and sets a random noise amount. More specifically, in the present exemplary embodiment, the noise suppression unit 108 sets a random noise amount (i.e., a noise suppression value) using the random system noise amount σD_COR, which is set by the control unit 107 in step S302, as a noise suppression parameter.

More specifically, the noise suppression unit 108 calculates, for example, a random noise amount σ based on the random system noise amount and the random quantum noise according to formulae (1) and (2) and sets the calculated random noise amount σ.

In step S317, the noise suppression unit 108 performs random noise suppression processing on the sensor characteristics correction-completed X-ray image referring to the random noise amount (i.e., the set value obtained in step S316). The X-ray image having been subjected to the random noise suppression processing can be referred to as the noise suppressed X-ray image. More specifically, the noise suppression unit 108 performs the random noise suppression processing according to the following formula (8) when NRImg represents the noise suppressed X-ray image, OrgImg represents the sensor characteristics correction-completed X-ray image, and σ(OrgImg) represents the random noise amount.

$$NRImg(x,y)=OrgImg(x,y)-a\cdot\sigma(OrgImg(x,y)) \quad (8)$$

As apparent from formula (8), the noise suppression unit 108 subtracts the random noise amount (σ(OrgImg)) from the sensor characteristics correction-completed X-ray image (OrgImg) to perform the random noise suppression processing. Formula (8) includes a coefficient "a" that can be used as an item capable of adjusting the effects brought by the noise suppression processing. The coefficient "a" is, for example, a value that may be given by a user before starting an imaging operation, and a value that may be stored beforehand in the internal memory of the noise suppression unit 108.

In step S318, the noise suppression unit 108 outputs a noise suppressed X-ray image having been subjected to the noise suppression processing to the image output unit 109. Then, the image output unit 109 performs processing for outputting the noise suppressed X-ray image received from the noise suppression unit 108, if necessary, to an external device of the X-ray image processing apparatus 100. Then, the X-ray image processing apparatus 100 terminates the processing of the flowchart illustrated in FIG. 3.

A second exemplary embodiment of the present invention is described below. Similar to the above-described first exemplary embodiment, the X-ray image processing apparatus 100 according to the second exemplary embodiment of the present invention performs processing similar to steps S301 to S316 of the flowchart illustrated in FIG. 3. Then, the X-ray image processing apparatus 100 according to the second exemplary embodiment employs recursive filter processing in step S317 illustrated in FIG. 3, in which the noise suppression unit 108 performs the random noise suppression processing.

In the second exemplary embodiment, the image correction unit 106 can input a recursive processing-completed image, which is output in the preceding frame, in addition to the sensor characteristics correction-completed X-ray image, to the noise suppression unit 108. The following formula (9) expresses the recursive filter processing performed in this case.

$$Y(n)=X(n)+a(Y(n-1)-X(n)) \quad (9)$$

In formula (9), Y(n) represents a recursive filter processing-completed image of the n-th frame and X(n) represents a sensor characteristics correction-completed X-ray image of the n-th frame. The coefficient "a" is a feedback coefficient. The coefficient "a" is, for example, a value that may be given by a user before starting an imaging operation, and a value that may be stored beforehand in the internal memory of the noise suppression unit 108.

The present exemplary embodiment performs the recursive filter processing according to formula (9), to suppress noises in the time axis direction. Accordingly, if a pixel has a large movement between frames, an image may include a blur caused by the movement. Hence, the present exemplary embodiment detects a movement in a pixel and reduces the feedback coefficient (i.e., the coefficient "a") according to a detected movement so as to reduce a blur caused by the movement. The random noise amount σ (i.e., the set value obtained in step S316) can be used as a movement detection parameter that may be used to detect a movement. In this case, the following formula (10) can be used for the movement determination.

if $|Y(n-1)-X(n)|\geq \alpha\cdot\sigma(X(n))$ MOVEMENT else $|Y(n-1)-X(n)|<\alpha\cdot\sigma(X(n))$ NOISE $\quad (10)$ In formula (10), "α" is an adjustment parameter that may be used to adjust a noise suppression force. The value of "α" is in a range from 0 to 1. A determination of a noise or a movement can be performed according to formula (10) by comparing a value Y(n−1)−X(n), which may be removed as a random noise amount in the recursive filter processing, with the random noise amount σ. For example, the noise suppression unit 108 illustrated in FIG. 1 can correct the coefficient "a" and perform the above-described determination. The noise suppression unit 108, which is capable of correcting the coefficient "a", can serve as a coefficient correction unit.

In this case, the noise suppression unit 108 serving as the coefficient correction unit corrects the coefficient "a", which is for example acquired from its internal memory. The noise suppression unit 108 stores the corrected coefficient "a" in its internal memory. FIGS. 5A to 5D and FIGS. 6A to 6D illustrate example feedback coefficient (i.e., coefficient "a") correction processing according to the second exemplary embodiment of the present invention.

More specifically, FIGS. 5A to 5D illustrate examples of continuous functions 501 to 504. FIGS. 6A to 6D illustrate examples of discrete functions 601 to 604.

In the present exemplary embodiment, a desired function may be selected from the examples illustrated in FIGS. 5A to 5D and FIG. 6A to 6D. The coefficient "a" is regarded as a certainty in determining whether the difference value between the value Y(n−1)−X(n) and the random noise amount σ is a movement. The noise suppression unit 108 determines that the possibility of a movement becomes higher if the coefficient "a" approaches 0.

Accordingly, it is useful to reduce the coefficient "a" when the difference value approaches 0. The continuous functions illustrated in FIGS. 5A to 5D are first-order functions and can be replaced with higher-order functions. In each of FIGS. 5A to 5D and FIG. 6A to 6D, the coefficient "a" has a maximum value of 1 and a minimum value of 0. However, the maximum value can be set to a value less than 1 and the minimum value can be set to a value greater than 0.

A third exemplary embodiment of the present invention is described below. Similar to above-described second exemplary embodiment, according to the third exemplary embodiment of the present invention, the noise suppression unit 108 employs recursive filter processing in step S317 illustrated in FIG. 3, in which the noise suppression unit 108 performs the random noise suppression processing. In this case, instead of using formula (10) described in the second exemplary embodiment, the third exemplary embodiment uses the following formula (11) to determine the movement.

if $std(X(n))\geq \alpha\cdot\sigma(X(n))$ MOVEMENT else $std(X(n))<\alpha\cdot\sigma(X(n))$ NOISE $\quad (11)$ In formula (11), "std" is a function that can be used to obtain a standard deviation. In this case, it is useful to set a concerned region including a target pixel (i.e., a processing object) of a sensor characteristics correction-completed X-ray image X(n) and calculate a standard deviation in the concerned region. Then, it is useful to perform the movement determination by comparing the calculated standard deviation with the random noise amount. In this case, the standard deviation may be replaced with a variance.

A fourth exemplary embodiment of the present invention is described below. Similar to the above-described first exemplary embodiment, the X-ray image processing apparatus 100 according to the fourth exemplary embodiment of the present invention performs processing similar to steps S301 to S316 of the flowchart illustrated FIG. 3. The X-ray image processing apparatus 100 according to the fourth exemplary embodiment employs low-pass filter processing in step S317 illustrated in FIG. 3, in which the noise suppression unit 108 performs random noise suppression processing.

The low-pass filter processing requires a filter size and a filter coefficient that may be given by a user, for example, before starting an imaging operation and can be stored, for example, in the internal memory of the noise suppression unit 108.

The low-pass filter processing according to the present exemplary embodiment is performed to suppress noises in the space direction. Accordingly, if the low-pass filter processing is applied to an edge region, the edge may be blurred. Hence, it is useful to detect an edge and, if the pixel is in an edge region, then change the filter coefficient into a coefficient having a weight on its center so as to prevent the edge from being blurred.

The random noise amount σ (i.e., the set value obtained in step S316) can be used as an edge detection parameter (i.e., a parameter that may be used to detect an edge). The following formula (12) can be used to determine an edge.

if $|X(n,x+i,y+j)-X(n,x,y)| \geq \alpha \cdot \sigma(X(n,x,y))$ EDGE else $|X(n,x+i,y+j)-X(n,x,y)| < \alpha \cdot \sigma(X(n,x,y))$ NOISE (12)

In formula (12), "α" is a parameter that may be used to adjust the noise suppression force. Parameters "i" and "j" define a search range of a filter region. In the present exemplary embodiment, a determination of a noise or an edge can be performed according to formula (12) by obtaining a difference relative to a peripheral pixel and comparing the obtained difference with the random noise amount σ.

The filter coefficient can be given as a continuous function variable according to a difference relative to the random noise amount σ or can be a discrete function that may be designated independently for each range. For example, the noise suppression unit 108 illustrated in FIG. 1 performs filter coefficient correction processing including the above-described determination. The noise suppression unit 108, which is capable of performing the filter coefficient correction processing, can serve as a coefficient correction unit.

In this case, the noise suppression unit 108 serving as the coefficient correction unit may correct a filter coefficient acquired, for example, from its internal memory and may store the corrected filter coefficient in the internal memory.

Figure 7A:
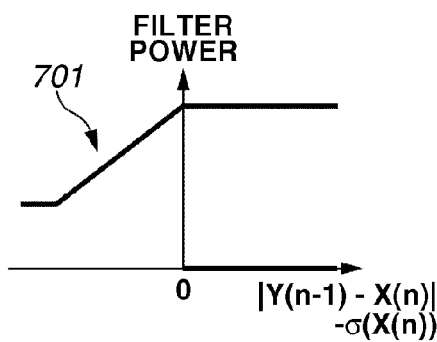
FIGS. 7A to 7D illustrate example functions that may be used in filter coefficient correction processing.
Figure 7C:
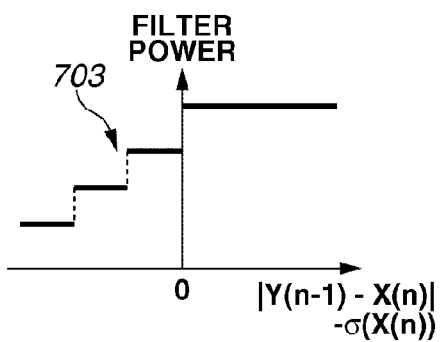
Figure 7B:
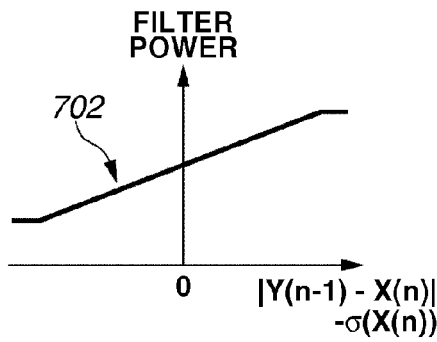
Figure 7D:
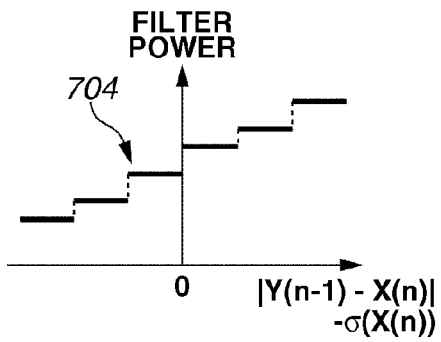
Figure 9A:
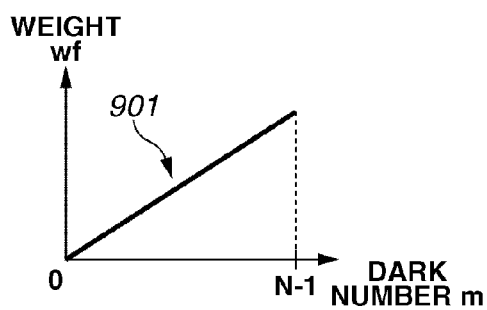
FIGS. 9A to 9D illustrate examples of a weighting function that can be used in a "front N-sheet" dark correction to generate a composite dark image.
Figure 9C:
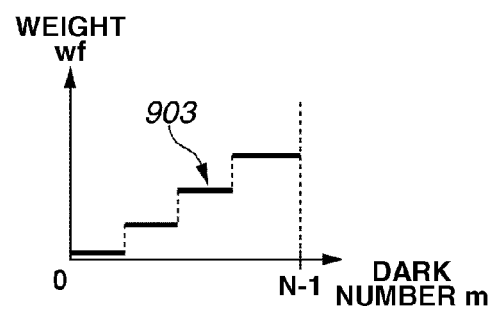
Figure 9B:
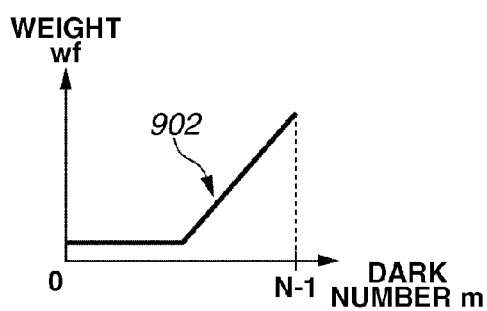
Figure 9D:
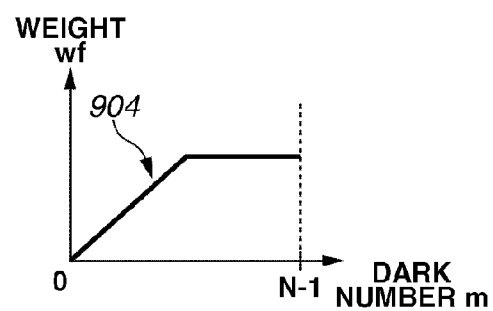
Figure 10A:
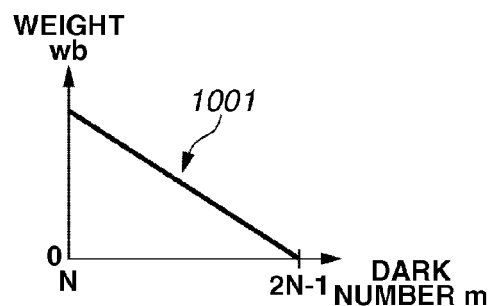
FIGS. 10A to 10D illustrate examples of a weighting function that can be used in a "back N-sheet" dark correction to generate a composite dark image.
Figure 10C:
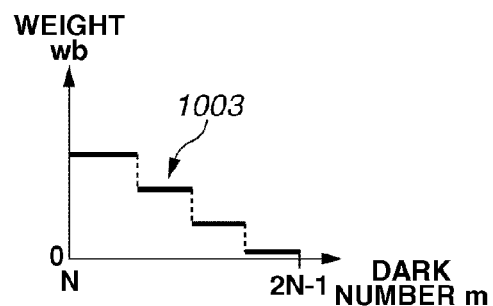
Figure 10B:
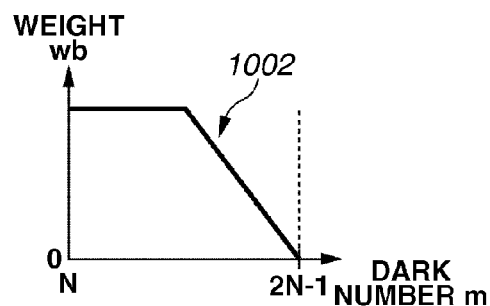
Figure 10D:
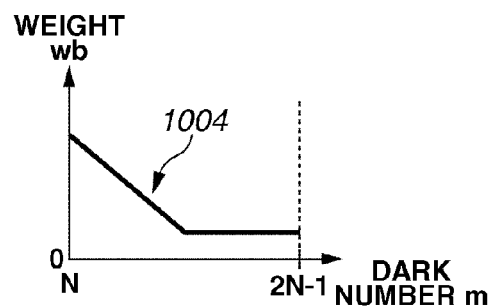
Figure 11A:
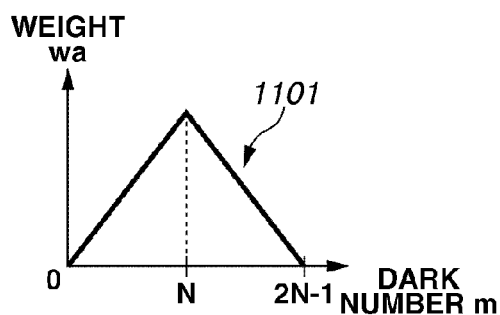
FIGS. 11A to 11F illustrate examples of a weighting function that can be used in a "front/back N-sheet" dark correction to generate a composite dark image.
Figure 11D:
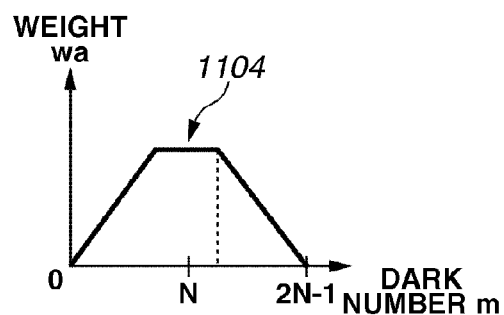
Figure 11B:
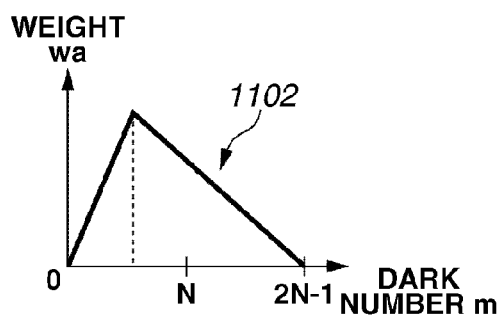
Figure 11E:
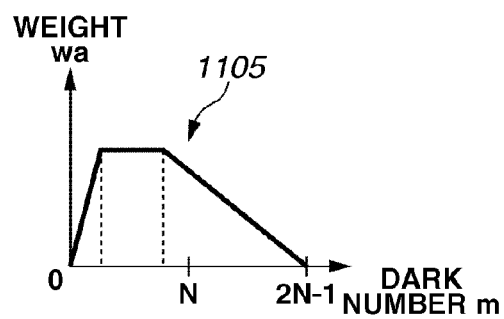
Figure 11C:
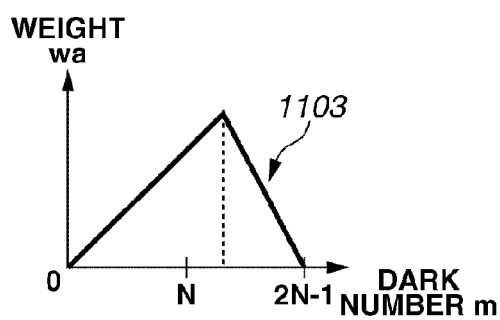
Figure 11F:
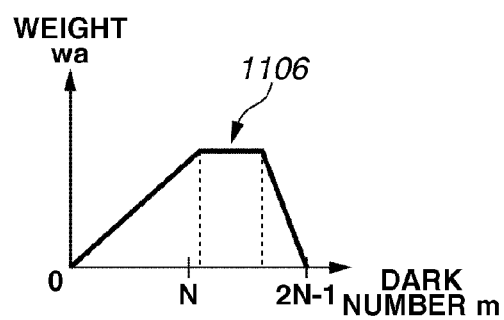
Figure 12:
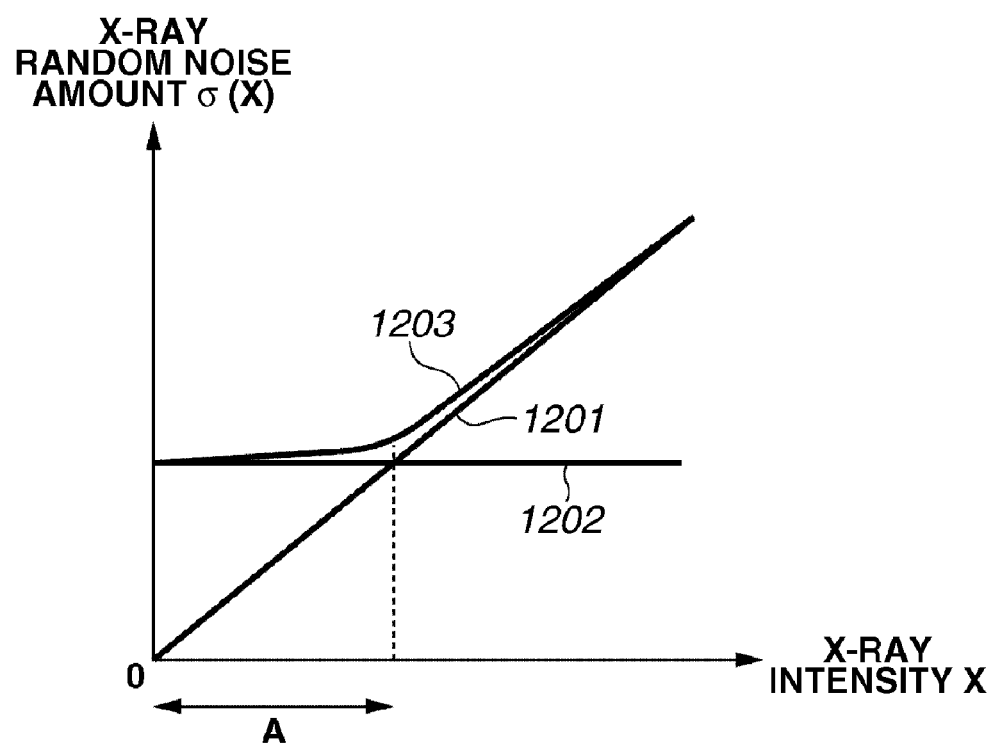
FIG. 12 is a characteristic graph illustrating an example of a relationship between the X-ray intensity "X" defined by formula (1) and the X-ray random noise amount $\sigma(X)$.
Figures 13A, 13B, 13C:
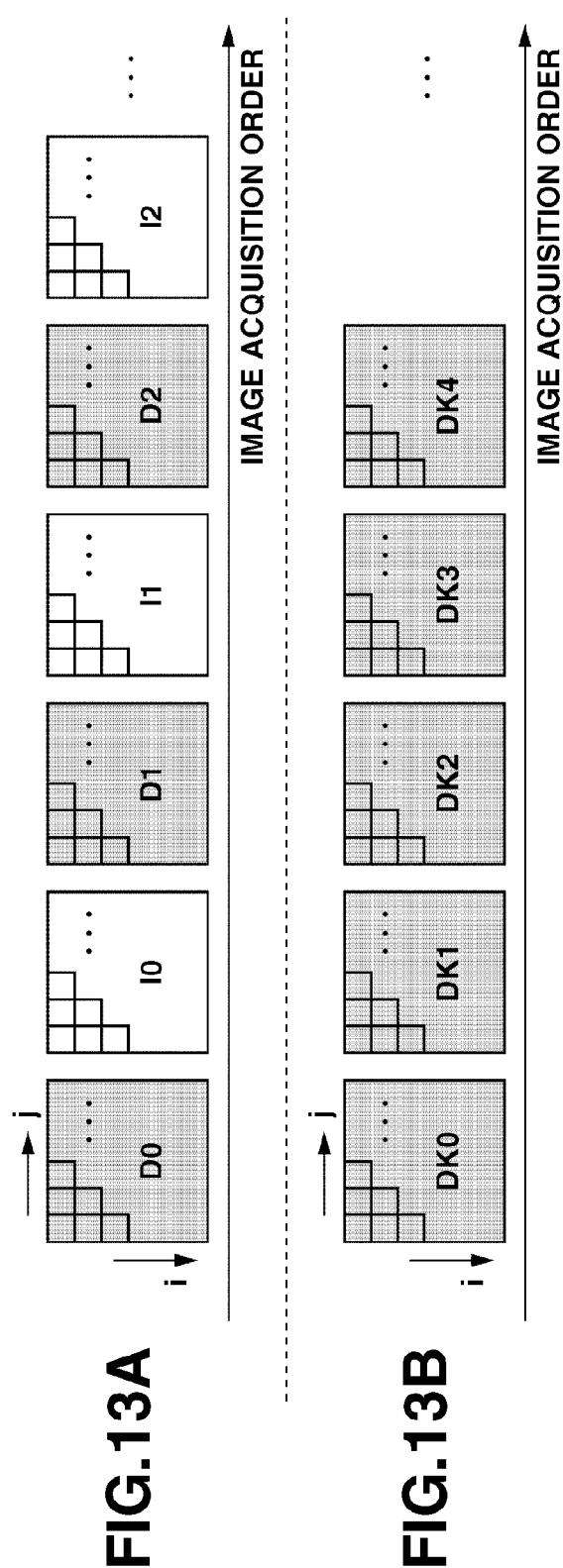
FIGS. 13A to 13C illustrate general dark correction methods.

FIGS. 7A to 7D illustrate examples of filter coefficient correction processing according to the fourth exemplary embodiment of the present invention. More specifically, FIGS. 7A and 7B illustrate examples of continuous functions 701 and 702. FIGS. 7C and 7D illustrate examples of discrete functions 703 and 704.

In the present exemplary embodiment, a desired function can be selected from the functions illustrated in FIGS. 7A to 7D. The filter coefficient is regarded as a certainty in determining whether a difference value between the difference relative to a peripheral pixel and the random noise amount σ is an edge. The noise suppression unit 108 determines that the possibility of an edge becomes higher if the filter coefficient approaches 0.

Accordingly, it is useful to change the configuration of the filter coefficient into a configuration having a weight on its center, in other words, to increase the filter power, when the difference value approaches 0. The continuous functions illustrated in FIGS. 7A and 7B are first-order functions and can be replaced with higher-order functions.

A fifth exemplary embodiment of the present invention is described below. Similar to the above-described first exemplary embodiment, the X-ray image processing apparatus 100 according to the fifth exemplary embodiment of the present invention performs processing similar to steps S301 to S316 of the flowchart illustrated FIG. 3. The X-ray image processing apparatus 100 according to the fifth exemplary embodiment employs the recursive filter processing described in the second exemplary embodiment and the low-pass filter processing described in the fourth exemplary embodiment in step S317 illustrated in FIG. 3, in which the noise suppression unit 108 performs the random noise suppression processing.

As described in the second exemplary embodiment, an image including a blur may be generated if the recursive filter processing is applied to a moving subject. Hence, it is useful to detect a movement in a pixel and, if any movement is detected, then apply the low-pass filter as described in the fourth exemplary embodiment so as to reduce a blur caused by the movement.

A method for detecting a movement in this case is similar to that described in the second exemplary embodiment. The threshold value is not limited to only one. It may be useful to prepare a plurality of thresholds that may cause stepwise changes. For example, it is useful to select two or more filters (e.g., a plurality of low-pass filters or a plurality of recursive filters) according to the random noise amount σ to enhance the robustness against a movement and increase the noise suppression force.

A sixth exemplary embodiment of the present invention is described below. The sixth exemplary embodiment of the present invention is different from the first exemplary embodiment in the method for calculating the random system noise amount (i.e., the processing performed in step S302 of the flowchart illustrated in FIG. 3).

In the sixth exemplary embodiment, similar to the first exemplary embodiment, if a user selects a dark correction method, then in step S301, the dark correction mode input unit 102 performs processing for inputting a dark correction mode based on the selected dark correction method.

In step S302, the control unit 107 sets the random system noise amount σD_COR, which is for example acquired from its internal memory, according to the dark correction mode entered from the dark correction mode input unit 102. For example, the control unit 107 stores the random system noise amount σD_COR in its internal memory.

In the present exemplary embodiment, the control unit 107 may calculate the random system noise amount σD_COR for each dark correction mode according to the following formulae (13) to (18), for example, before starting an imaging operation or each time when a dark image is acquired. For example, the control unit 107 can store the calculated random system noise amount σD_COR in its internal memory.

In the following description, it is assumed that two sheets of dark images are presently acquired. In this case, D1 represents a dark image acquired from the first sheet. D2 represents a dark image acquired from the second sheet. D3 represents a dark image acquired from the third sheet. In this case, if the input dark correction mode is the "forward" dark correction, following formula (13) can be used to calculate the random system noise amount σD_COR_PRE. In the following formula (13), a function Var( ) is a function that can be used to obtain a variance.

$$\sigma_{D\_COR\_PRE} = \text{Var}(D_1 - D_2) \quad (13)$$

If the input dark correction mode is the "backward" dark correction, the following formula (14) can be used to calculate the random system noise amount σD_COR_POST.

$$\sigma_{D\_COR\_POST} = \text{Var}(D_2 - D_3) \quad (14)$$

If the input dark correction mode is the "average" dark correction, the following formula (15) can be used to calculate the random system noise amount σD_COR_AVE.

$$\sigma_{D\_COR\_AVE} = \text{Var}\left(D_3 - \frac{D_1 + D_2}{2}\right) \quad (15)$$

If the input dark correction mode is the "diced" dark correction, the following formula (16) can be used to calculate the random system noise amount σD_COR_CRS.

$$\sigma_{D\_COR\_CRS} = \text{Var}(f(D_1(x,y), D_2(x,y), D_3(x,y)))$$

if $x$=odd and $y$=odd $f=D_3(x,y)-D_1(x,y)$ elseif $x$=odd and $y$=even $f=D_3(x,y)-D_1(x,y)$ elseif $x$=even and $y$=even $f=D_3(x,y)-D_2(x,y)$ else $f=D_3(x,y)-D_2(x,y)$ (16)

If the input dark correction mode is the "even-odd" dark correction, the following formula (17) can be used to calculate a random system noise amount σD_COR_OE.

$$\sigma_{D\_COR\_OE} = \text{Var}(g(D_1(x,y), D_2(x,y), D_3(x,y)))$$

if $x$=odd $g=D_3(x,y)-D_1(x,y)$ else $g=D_3(x,y)-D_2(x,y)$ (17)

If the input dark correction mode is the "N-sheet" dark correction, the following formula (18) can be used to calculate a random system noise amount σD_COR_N. In this case, Dm represents a dark image acquired from the m-th sheet.

$$\sigma_{D\_COR\_N} = \text{Var}\left(D_{N+1} - \frac{\sum_{m=1}^{N} D_m}{N}\right) \quad (18)$$

As described above, the present exemplary embodiment reproduces a state where the dark correction can be performed based on an X-ray image and a dark image and calculates each random system noise amount. However, formula (14) may be used when the input dark correction mode is the "forward" dark correction. Formula (13) may be used when the input dark correction mode is the "backward" dark correction.

If the input dark correction mode is the "diced" dark correction, the function "f" in formula (16) can be replaced with that in the following formula (19).

if $x$=odd and $y$=odd $f=D_3(x,y)-D_2(x,y)$ elseif $x$=odd and $y$=even $f=D_3(x,y)-D_2(x,y)$ elseif $x$=even and $y$=even $f=D_3(x,y)-D_1(x,y)$ else $f=D_3(x,y)-D_1(x,y)$ (19)

If the input dark correction mode is the "even-odd" dark correction, the function "g" in the following formula (17) can be replaced with that in the following formula (20).

if $x$=odd $g=D_3(x,y)-D_2(x,y)$ else $g=D_3(x,y)-D_1(x,y)$ (20)

Similar to the first exemplary embodiment, if the processing of step S302 according to the present exemplary embodiment is completed, the X-ray image processing apparatus 100 executes the processing of steps S303 to S318.

A seventh exemplary embodiment of the present invention is described below. According to the above-described first to sixth exemplary embodiments, a user inputs a selected dark correction method to the dark correction mode input unit 102. In the seventh exemplary embodiment, a user may input a selected image capturing method to the dark correction mode input unit 102.

In the seventh exemplary embodiment, if a user selects an image capturing method, then in step S301 of FIG. 3, the dark correction mode input unit 102 performs processing for selecting a dark correction method corresponding to the image capturing method designated by the user. Then, the dark correction mode input unit 102 performs processing for inputting a dark correction mode according to the selected dark correction method to the functional components 101, 103, and 107 of the X-ray image processing apparatus 100.

For example, the image capturing method in this case includes various shooting modes relating to the capturing of X-ray images, including capturing of moving images and capturing of still images. The capturing of a moving image may include capturing of fluoroscopic images, capturing of cine-radiographic images, and capturing of Digital Subtraction Angiography (DSA) images.

The image capturing method may further include various types of the X-ray sensor 210 (i.e., a radioactive-ray sensor), e.g., a Complementary Metal Oxide Semiconductor (CMOS) sensor and a Metal-Insulator-Semiconductor (MIS) sensor. The image capturing method may additionally include various information (e.g., position of subject, amount of X-ray, frame rate, resolution of X-ray sensor, and method for driving X-ray sensor).

In this case, the dark correction mode input unit 102 may store a correspondence table that indicate a relationship between various image capturing methods and suitable dark correction methods, which can be prepared beforehand in its internal memory. When a user inputs a desired image capturing method, the dark correction mode input unit 102 can select an appropriated dark correction method referring to the correspondence table.

For example, if the X-ray sensor 210 is a MIS sensor, each X-ray image acquired by the MIS sensor requires a dark image. Therefore, a dark image captured immediately before or immediately after the X-ray image is selected. Accordingly, in this case, the dark correction mode input unit 102 performs processing for selecting an appropriate dark correction method, which can be one of the "forward" dark correction, the "backward" dark correction, the "average" dark correction, the "diced" dark correction, and the "even-odd" dark correction.

If a moving image is taken and the X-ray sensor 210 is a MIS sensor, the dark correction mode input unit 102 may select the "forward" dark correction as an optimum dark correction method to increase the frame rate. If a still image is taken and the X-ray sensor 210 is a MIS sensor, the dark correction mode input unit 102 may select the "average" dark correction as an optimum dark correction method to improve the image quality. For example, the average" dark correction can be realized by averaging a forward dark image and a backward dark image.

If the X-ray sensor 210 is a CMOS sensor, it is not necessary to use a dark image for each X-ray image. Therefore, in this case, the dark correction mode input unit 102 may select the "N-sheet" dark correction (i.e., the processing using N sheets of dark images) as an optimum dark correction method.

As described above, the dark correction mode input unit 102 performs processing for selecting an optimum dark correction method according to an image capturing method selected by a user and then performs processing for inputting a dark correction mode based on the selected dark correction method.

Similar to the first exemplary embodiment, if the processing of step S301 according to the present exemplary embodiment is completed, the X-ray image processing apparatus 100 executes the processing of steps S302 to S318.

As described above, the present exemplary embodiment can optimize the random noise suppression processing even when the random system noise changes due to an employment of another X-ray sensor, a choice of another dark correction method, and variations in shooting conditions. Therefore, for example, the present exemplary embodiment can improve the diagnosing accuracy and surgery accuracy in various medical cares.

An eighth exemplary embodiment of the present invention is described below. The eighth exemplary embodiment of the present invention is different from the first exemplary embodiment in the method for calculating the random system noise amount in step S302 of the flowchart illustrated in FIG. 3.

In the eighth exemplary embodiment, similar to the first exemplary embodiment, if a user selects a dark correction method, then in step S301, the dark correction mode input unit 102 performs processing for inputting a dark correction mode based on the selected dark correction method.

In step S302, the control unit 107 sets the random system noise amount σD_COR, which is for example acquired from its internal memory, according to the dark correction mode entered from the dark correction mode input unit 102. For example, the control unit 107 stores the random system noise amount σD_COR in its internal memory.

In the present exemplary embodiment, the control unit 107 may calculate the random system noise amount σD_COR for each dark correction mode according to the following formulae (21) to (27), for example, before starting an imaging operation or each time when a dark image is acquired. For example, the control unit 107 can store the calculated random system noise amount σD_COR in its internal memory.

In the present exemplary embodiment, to calculate the random system noise amount σD_COR, the image acquisition unit 101 acquires K+1 sheets of dark images D0 to DK before starting an imaging operation. The image acquisition unit 101 further acquires K sheets of X-ray images I0 to IK−1 when the X-ray sensor 210 is irradiated with an X-ray in a state where no subject is disposed.

In this case, if the input dark correction mode is the "forward" dark correction, the following formula (21) can be used to calculate the random system noise amount σD_COR_PRE.

$$\sigma_{D\_COR\_PRE} = RS(I_0 - D_0, I_1 - D_1, \ldots I_{K-1} - D_{K-1}) \quad (21)$$

In formula (21), a function RS( ) can be used to calculate a coefficient from sampling points of input values I0–D0 and IK−1–DK−1 according to an approximation defined by the following formula (22).

$$\sigma^2 = AX^2 + BX + C^2 \quad (22)$$

Formula (22) is an approximation formula representing a relationship between a pixel value of an X-ray image and a random noise. In formula (22), "A" to "C" are coefficients and "X" represents the pixel value of the X-ray image. The random system noise is a constant value that is not dependent on the X-ray dose. The coefficient "C" corresponds to the random system noise. Accordingly, an output of the function RS( ) is equal to the coefficient "C." If the input dark correction mode is the "backward" dark correction, the following formula (23) can be used to calculate the random system noise amount σD_COR_POS.

$$\sigma_{D\_CORPOS} = RS(I_0 - D_1, I_1 - D_2, \ldots I_{K-1} D_K) \quad (23)$$

If the input dark correction mode is the "average" dark correction, the following formula (24) can be used to calculate the random system noise amount σD_COR_AVE.

$$\sigma_{D\_COR\_AVE} = \\ RS\left(I_0 - \frac{D_0 + D_1}{2}, I_1 - \frac{D_1 + D_2}{2}, \ldots I_{K-1} - \frac{D_{k-1} + D_K}{2}\right) \quad (24)$$

If the input dark correction mode is the "diced" dark correction, the following formula (25) can be used to calculate the random system noise amount σD_COR_CRS.

$$\sigma_{D\_COR\_CRS} = RS(h(I_0(x,y), D_0(x,y), D_1(x,y)), \ldots, \\ h(I_{K-1}(x,y), D_{K-1}(x,y), D_K(x,y)))$$

if $x$=odd and $y$=odd $h = I_k(x,y) - D_k(x,y)$ elseif $x$=odd and $y$=even $h = I_k(x,y) - D_k(x,y)$ elseif $x$=even and $y$=even $h = I_k(x,y) - D_{k+1}(x,y)$ else $h = I_k(x,y) - D_{k-1}(x,y)$ $\quad (25)$ If the input dark correction mode is the "even-odd" dark correction, the following formula (26) can be used to calculate the random system noise amount σD_COR_OE.

$$\sigma_{D\_COR\_OE} = RS(J(I_0(x,y), D_0(x,y), D_1(x,y)), \ldots, J(I_{K-1}(x,y), D_{K-1}(x,y), D_K(x,y)))$$

if $x$=odd $J = I_k(x,y) - D_k(x,y)$ else $J = I_k(x,y) - D_{k+1}(x,y)$ $\quad (26)$ If the input dark correction mode is the "N-sheet" dark correction, the following formula (27) can be used to calculate the random system noise amount σD_COR_N. In this case, Dm represents a dark image acquired from the m-th sheet.

$$\sigma_{D\_COR\_N} = RS\left(I_0 - \frac{\sum_{m=1}^{N} D_m}{N}, I_1 - \frac{\sum_{m=1}^{N} D_m}{N}, \ldots I_{K-1} - \frac{\sum_{m=1}^{N} D_m}{N}\right) \quad (27)$$

As described above, the present exemplary embodiment reproduces a state where the dark correction can be performed based on an X-ray image and a dark image and calculates each random system noise amount. However, formula (23) may be used when the input dark correction mode is the "forward" dark correction. Formula (21) may be used when the input dark correction mode is the "backward" dark correction. If the input dark correction mode is the "diced" dark correction, the function "h" in formula (25) may be replaced with that in the following formula (28).

if $x$=odd and $y$=odd $h=I_k(x,y)-D_{k+1}(x,y)$ elseif $x$=odd and $y$=even $h=I_k(x,y)-D_{k+1}(x,y)$ elseif $x$=even and $y$=even $h=I_k(x,y)-D_k(x,y)$ else $h=I_k(x,y)-D_k(x,y)$ (28)

If the input dark correction mode is the "even-odd" dark correction, formula (26) defining the function J may be replaced with the following formula (29).

if $x$=odd $J=I_k(x,y)-D_{k+1}(x,y)$ else $J=I_k(x,y)-D_k(x,y)$ (29)

Similar to the first exemplary embodiment, if the processing of step S302 according to the present exemplary embodiment is completed, the X-ray image processing apparatus 100 executes the processing of steps S303 to S318.

A ninth exemplary embodiment of the present invention is described below. The ninth exemplary embodiment of the present invention is different from the first exemplary embodiment in the method for calculating the random system noise correction coefficient kσ that may be used in step S302 to calculate the random system noise amount in the flowchart illustrated in FIG. 3.

In the ninth exemplary embodiment, similar to the first exemplary embodiment, if a user selects a dark correction method, then in step S301, the dark correction mode input unit 102 performs processing for inputting a dark correction mode based on the selected dark correction method.

In this case, the dark correction method (i.e., the dark correction mode) according to the present exemplary embodiment includes a "front N-sheet" dark correction, a "back N-sheet" dark correction, and a "front/back N-sheet" dark correction.

In step S302, the control unit 107 acquires the random system noise amount σs, for example from its internal memory, according to the dark correction mode entered from the dark correction mode input unit 102, and calculates the correction coefficient kσ. Then, the control unit 107 calculates and sets the random system noise amount σD_COR based on the correction coefficient kσ and the random system noise amount σs. The control unit 107 stores the random system noise amount σD_COR, for example, in its internal memory.

The following method can be used to calculate the correction coefficient kσ when the dark correction mode is one of the "front N-sheet" dark correction, the "back N-sheet" dark correction, and the "front/back N-sheet" dark correction according to the present exemplary embodiment.

FIGS. 8A and 8B illustrate examples of the dark correction mode (i.e., the dark correction method) according to the ninth exemplary embodiment of the present invention. More specifically, the dark correction modes illustrated in FIGS. 8A and 8B are the "front N-sheet" dark correction, the "back N-sheet" dark correction, and the "front/back N-sheet" dark correction.

As illustrated in FIG. 8A, the image acquisition unit 101 acquires N sheets of dark images (i.e., DK0 to DKN−1) and then acquires M sheets of X-ray images (i.e., I0 to IM−1). The image acquisition unit 101 further acquires N sheets of dark images (i.e., DKN to DK2N−1).

The "front N-sheet" dark correction uses a composite dark image resulting from N sheets of the dark images (i.e., DK0 to DKN−1) which are acquired before the X-ray images (i.e., I0 to IM−1) as illustrated in FIG. 8B.

The "back N-sheet" dark correction uses a composite dark image resulting from N sheets of the dark images (i.e., DKN to DK2N−1) which are acquired after the X-ray images (i.e., I0 to IM−1) as illustrated in FIG. 8B. The "front/back N-sheet" dark correction uses a composite dark image resulting from 2N sheets of dark images (i.e., DK0 to DKN−1 and DKN to DK2N−1) which are acquired before and after the X-ray images (i.e., I0 to IM−1).

FIGS. 9A to 9D illustrate examples of a weighting function "wf" that can be used in the "front N-sheet" dark correction to generate a composite dark image according to the ninth exemplary embodiment of the present invention. More specifically, FIGS. 9A to 9D illustrate functions 901 to 904 that can serve as the weighting function "wf." In the present exemplary embodiment, a desired weighting function "wf" can be selected from the example functions illustrated in FIGS. 9A to 9D.

The "front N-sheet" dark correction generates a composite dark image by adding the N sheets of the dark images (i.e., DK0 to DKN−1) referring to the weighting function "wf" selected from FIGS. 9A to 9D.

FIGS. 10A to 10D illustrate examples of a weighting function "wb" that can be used in the "back N-sheet" dark correction to generate a composite dark image according to the ninth exemplary embodiment of the present invention. More specifically, FIGS. 10A to 10D illustrate example functions 1001 to 1004 that can serve as the weighting function "wb." In the present exemplary embodiment, a desired weighting function "wb" can be selected from the example functions illustrated in FIGS. 10A to 10D.

The "back N" dark correction generates a composite dark image by adding the N sheets of the dark images (DKN to DK2N−1) referring to the weighting function "wb" selected from FIGS. 10A to 10D.

FIGS. 11A to 11F illustrate examples of a weighting function "wa" that can be used in the "front/back N-sheet" dark correction to generate a composite dark image according to the ninth exemplary embodiment of the present invention. More specifically, FIGS. 11A to 11F illustrate example functions 1101 to 1106 that can serve as the weighting function "wa." In the present exemplary embodiment, a desired weighting function "wa" can be selected from the example functions illustrated in FIGS. 11A to 11F.

The "front/back N" dark correction generates a composite dark image by adding the 2 N sheets of dark images (DK0 to DKN−1 and DKN to DK2N−1) referring to the weighting function "wa" selected from FIGS. 11A to 11F. In the above-described cases, a sum of weight values is equal to 1.

According to the weighting functions "wf", "wb" and "wa" illustrated in FIGS. 9A to 9D to FIGS. 11A to 11F, a large weight value is set for a dark image if the acquisition order of the dark image is adjacent to that of the X-ray image.

If the dark correction mode entered in step S301 is the "front N-sheet" dark correction, the following formulae (30) and (31) can be used to calculate the correction coefficient kσ.

$$\sigma_{FDN\_COR} = \sigma_D \cdot \sqrt{(1)^2 + \left(\sqrt{\frac{\sum_{m=0}^{N-1} wf(m)^2}{N^2}}\right)^2} \quad (30)$$

$$= \sigma_D \cdot \sqrt{\frac{N^2 + \sum_{m=0}^{N-1} wf(m)^2}{N^2}}$$

$$k_\sigma = \sigma_D \cdot \sqrt{\frac{N^2 + \sum_{m=0}^{N-1} wf(m)^2}{2N^2}} \quad (31)$$

If the dark correction mode entered in step S301 is the "back N-sheet" dark correction, the following formulae (32) and (33) can be used to calculate the correction coefficient kσ.

$$\sigma_{BDN\_COR} = \sigma_D \cdot \sqrt{(1)^2 + \left(\sqrt{\frac{\sum_{m=N}^{2N-1} wb(m)^2}{N^2}}\right)^2} \quad (32)$$

$$= \sigma_D \cdot \sqrt{\frac{N^2 + \sum_{m=N}^{2N-1} wb(m)^2}{N^2}}$$

$$k_\sigma = \sigma_D \cdot \sqrt{\frac{N^2 + \sum_{m=N}^{2N-1} wb(m)^2}{2N^2}} \quad (33)$$

If the dark correction mode entered in step S301 is the "front/back N-sheet" dark correction, the following formulae (34) and (35) can be used to calculate the correction coefficient kσ.

$$\sigma_{ADN\_COR} = \sigma_D \cdot \sqrt{(1)^2 + \left(\sqrt{\frac{\sum_{m=0}^{2N-1} wa(m)^2}{(2N)^2}}\right)^2} \quad (34)$$

$$= \sigma_D \cdot \sqrt{\frac{4N^2 + \sum_{m=0}^{2N-1} wa(m)^2}{4N^2}}$$

$$k_\sigma = \sigma_D \cdot \sqrt{\frac{4N^2 + \sum_{m=0}^{2N-1} wa(m)^2}{8N^2}} \quad (35)$$

Similar to the first exemplary embodiment, if the processing of step S302 according to the present exemplary embodiment is completed, the X-ray image processing apparatus 100 performs the processing of steps S303 to S318.

As described above, in the X-ray image processing apparatus 100 according to the present exemplary embodiment, the control unit 107 sets the random system noise amount (i.e., the noise suppression parameter) according to the dark correction mode entered from the dark correction mode input unit 102.

The noise suppression unit 108 sets the random noise amount based on the random system noise amount determined by the control unit 107. The noise suppression unit 108 performs noise suppression processing on the X-ray image having been subjected to the correction processing performed by the dark correction unit 105 based on the random noise amount.

The above-described configuration can optimize the noise suppression processing performed on an X-ray image and can acquire an X-ray image having a higher image quality.

A central processing unit (CPU) of a computer can execute a program stored in a random access memory (RAM) or a read only memory (ROM) to realize the processing of respective steps illustrated in FIG. 3, which describes the X-ray image processing method (i.e., the radiographic image processing method) for the X-ray image processing apparatus (i.e., the radiographic image processing apparatus) 100 according to the above-described exemplary embodiments. The present invention encompasses the above-described program and a computer-readable storage medium that stores the program.

More specifically, the program can be recorded in a storage medium (e.g., CD-ROM), or can be supplied to a computer via various transmission media. A storage medium storing the program can be selected from any one of a floppy disk, a hard disk, a magnetic tape, a magneto-optical (MO) disk, and a nonvolatile memory card, in addition to the CD-ROM. On the other hand, the media usable to transmit the program includes a communication medium for a computer network system (such as a local area network (i.e., LAN), a wide area network (i.e., WAN) represented by the Internet, and a wireless communication network), which can propagate carrier waves including program information. In this case, the communication medium includes a wired circuit (e.g., an optical fiber) and a wireless circuit.

The present invention is not limited to the computer that executes a supplied program to realize the functions of the X-ray image processing apparatus 100 according to the above-described exemplary embodiments. According to another aspect of the present invention, the program can cooperate with an operating system (OS) or application software running on the computer to realize the functions of the X-ray image processing apparatus 100 according to each exemplary embodiment. Additionally, the present invention encompasses a function expansion board or a function expansion unit of the computer that can execute part or all of the processing of the supplied program to realize the functions of the X-ray image processing apparatus 100 according to the present exemplary embodiment.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures, and functions.

This application claims priority from Japanese Patent Application No. 2008-131356 filed May 19, 2008, which is hereby incorporated by reference herein in its entirety.

What is claimed is:

1. A radiographic image processing apparatus comprising:
an image acquisition unit configured to acquire a radiographic image obtained by irradiating a subject with a radioactive ray and a dark image obtained without irradiating the radioactive ray;
a correction mode input unit configured to input a correction mode for correcting the radiographic image using the dark image;
a parameter setting unit configured to set a first parameter according to the correction mode;
a dark correction unit configured to correct the radiographic image based on the dark image according to the correction mode; and
a noise suppression unit configured to perform noise suppression processing on the radiographic image corrected by the dark correction unit, using the first parameter.

2. The radiographic image processing apparatus according to claim 1, wherein the image acquisition unit is configured to acquire a plurality of dark images according to the correction mode,
- wherein the radiographic image processing apparatus further includes a dark image generation unit configured to generate a composite dark image by combining the plurality of dark images acquired by the image acquisition unit,
- wherein the dark correction unit is configured to correct the radiographic image using the composite dark image according to the correction mode.

3. The radiographic image processing apparatus according to claim 1, wherein the parameter setting unit is configured to calculate a second parameter to be used for setting the first parameter according to the correction mode, and set the first parameter based on the second parameter.

4. The radiographic image processing apparatus according to claim 1, wherein the first parameter is a random system noise amount.

5. The radiographic image processing apparatus according to claim 1, wherein the noise suppression unit is configured to set a noise suppression value referring to the first parameter and perform the noise suppression processing based on the noise suppression value.

6. The radiographic image processing apparatus according to claim 5, wherein the noise suppression value is a random noise amount.

7. The radiographic image processing apparatus according to claim 5, wherein the noise suppression unit is configured to perform filter processing as the noise suppression processing, and is configured to select a plurality of filters for the filter processing referring to the noise suppression value.

8. The radiographic image processing apparatus according to claim 5, wherein the noise suppression unit is configured to perform filter processing as the noise suppression processing, and is configured to change a filter coefficient to be used for the filter processing referring to the noise suppression value.

9. The radiographic image processing apparatus according to claim 5, wherein the noise suppression unit is configured to determine a movement of the radiographic image that is subjected to the noise suppression processing, using the noise suppression value.

10. The radiographic image processing apparatus according to claim 1, wherein if an image capturing method for capturing the radiographic image is selected, the correction mode input unit is configured to input a correction mode corresponding to the selected image capturing method.

11. The radiographic image processing apparatus according to claim 10, wherein the image capturing method relates to at least one of a shooting mode in the capturing of the radiographic image, a type of a radioactive-ray sensor that detects the radiographic image, and a method for driving the radioactive-ray sensor.

12. A method for processing a radiographic image, comprising:
- acquiring a radiographic image obtained by irradiating a subject with a radioactive ray and a dark image obtained without irradiating the radioactive ray;
- inputting a correction mode for correcting the radiographic image using the dark image;
- setting a first parameter according to the correction mode;
- correcting the radiographic image based on the dark image according to the correction mode; and
- performing noise suppression processing on the corrected radiographic image, using the first parameter.

13. A computer-readable medium storing a computer program of instructions that cause a computer to perform a method, the method comprising:
- acquiring a radiographic image obtained by irradiating a subject with a radioactive ray and a dark image obtained without irradiating the radioactive ray;
- inputting a correction mode for correcting the radiographic image using the dark image;
- setting a first parameter according to the correction mode;
- correcting the radiographic image based on the dark image according to the correction mode; and
- performing noise suppression processing on the corrected radiographic image, using the first parameter.

* * * * *